United States Patent [19]

Olson et al.

[11] 4,263,329

[45] Apr. 21, 1981

[54] METHOD FOR IMPROVING TASTE AND STABILITY OF SAUSAGE

[75] Inventors: Dennis G. Olson, Lincoln, Nebr.; Hugo E. Wistreich, Chicago, Ill.

[73] Assignee: B. Heller & Company, Chicago, Ill.

[21] Appl. No.: 806,955

[22] Filed: Jun. 15, 1977

[51] Int. Cl.³ ............................................... A23B 4/12
[52] U.S. Cl. ................................... 426/310; 426/332; 426/646; 426/652
[58] Field of Search ................ 426/310, 332, 646, 652

[56] References Cited

U.S. PATENT DOCUMENTS 3,620,766 11/1971 Wallace ............................ 426/646 X
3,694,234 9/1972 Jones et al. ........................... 426/652

*Primary Examiner*—Robert J. Warden
*Attorney, Agent, or Firm*—McDougall, Hersh & Scott

[57] ABSTRACT

The improvement in taste and stability of cooked or smoked and cooked sausage wherein the cooked or smoked and cooked sausage is immersed in an aqueous acidic solution containing lactic acid as an essential component in amounts greater than 25% by weight alone or in combination with other edible acids up to a total acidity of 20% by weight.

7 Claims, No Drawings

METHOD FOR IMPROVING TASTE AND STABILITY OF SAUSAGE

This invention relates to sausage, smoked or unsmoked, and method for the preparation of same.

Current procedures in the preparation of meat sausage is to blend the meats with suitable spices and flavoring and stuff the blended mixture into a suitable casing for further processing. If the ingredients are to be subjected to coagulation by fermentation, fermented sugars such as dextrose are added as an ingredient to the mix along with a bacterial starter. Fermentation is carried out at high humidity while at a temperature of about 80°-100° F., over a long period of time, such as up to 100 hours. In the event that the sausage mix is not to be subjected to coagulation by fermentation, the desired degree of coagulation can be achieved during the smoking and cooking steps. In any event, such coagulation is usually carried out in conjunction with the smoking step, or separate and apart therefrom, and preferably immediately after the smoking step.

The encased sausage mixture is smoked and cooked by suspending in a smoke house for exposure to smoke, generated directly from hardwood or indirectly from liquid smoke, while at a temperature of about 110° F., until the product reaches the desired flavor.

The smoked or unsmoked sausage is cooked by continuing to heat in the smoke house while raising the temperature of the smoke house 15° F. per hour until the product reaches an internal temperature of 150°-160° F., but with the dampers closed to prevent excessive drying.

Thereafter the cooked product is washed, as by showering with hot and/or with cold water, followed with drying and cooling to about 40° F. for storage.

It has been found, in accordance with the practice of this invention, that the stability of the product can be greatly improved and a desirable addition can be made to the flavor when the cooked or smoked and cooked sausage is exposed, as by immersion, in an aqueous solution of lactic acid, with or without other edible organic acids or preservatives. Such other edible organic acids or preservatives include acetic acid, benzoic acid, sorbic acid, parahydroxybenzoic acid, and the like and their corresponding esters such as the methyl, ethyl, propyl and up to heptyl esters. The treatment by immersion can be carried out at 45°-145° F.

The solution for best treatment of the sausage should be formulated to have a total titratable acidity within the range of 2-20% and preferably 4-10%, with at least 25% and preferably 40% of the total acidity being in the form of lactic acid. While the total acidity can exceed 20%, little if any benefit is derived from such higher concentration. The desired result can also be achieved with the solution having a total acidity as low as 1% but then a substantially longer exposure time is required to achieve the desired result. Immersion for a time sufficient to permit complete penetration is desired. From a practical standpoint, the desired results can be achieved by overnight immersion in the acid solution or immersion up to a number of weeks at about room temperature.

The post-treatment with lactic and/or lactic plus other edible organic acids operates to lower the pH of the product to less than 5.3 and preferably to within the range of 3.5 to 4.5. The flavor is enhanced by a tangy taste and the product is stable over long periods of time without undesirable increase in bacteria count.

Having described the basic concepts of the invention, illustration will now be made by way of the following examples:

EXAMPLES 1 TO 3

| Beef Sausage: | Ex. 1 | Ex. 2 | Ex. 3 |
|---|---|---|---|
| 75/85 Beef Trimmings | 100 lbs. | | |
| Cow meat 90% lean | | 75 lbs. | 60 lbs. |
| Beef Cheek meat trimmed | | | 20 lbs. |
| 50/50 Beef trimmings | | 25 lbs. | 20 lbs. |
| TOTAL | 100 lbs. | 100 lbs. | 100 lbs. |
| Other Ingredients | | | |
| Corn syrup solids | 2 lbs. | | |
| Salt | 1 lb. | 12 ozs. | |
| Curing salt (sodium nitrate 4%, sodium nitrite 6.25%) | | 4 ozs. | |
| Dextrose | 1 lb. | 8 ozs. | |
| Regular Ground Black Pepper | | 4 ozs. | |
| Charoil | | 4 ozs. | |
| Water | | 8 ozs. | |

PROCEDURE

Mix bacteria inoculum *Lactobacillus genera* well with 8 ozs. of lukewarm water. Do not use hot water.

Chop 20 lbs. of the 75/85 beef trimmings or cow meat or all of the beef cheek meat into a smooth emulsion adding all the other ingredients.

Grind the rest of the meat through a ¼" plate. Mix three minutes with the emulsion.

Stuff into beef middles or collagen casings in the 60-80 mm sizes. Tie off at 12 oz. to 1 lb. units and hang in smoke house.

Raise the temperature of the house 15° F. per hour until the product reaches an internal temperature of 152° F. The dampers remain closed throughout the process to prevent excess surface drying.

Immerse the processed sausage in an aqueous bath containing 3% acetic acid and 2% lactic acid overnight and then shower the product with cold water and store in a refrigerator at about 40° C.

EXAMPLE 4

| Polish sausage: | |
|---|---|
| Beef cheeks, untrimmed | 20 lbs. 0 oz. |
| Beef Head Meat | 20 lbs. 0 oz. |
| Beef Trim (55% fat) | 10 lbs. 0 oz. |
| Beef or pork hearts | 10 lbs. 0 ozs. |
| Pork trim (55% fat) | 40 lbs. 0 ozs. |
| Other ingredients | |
| Cereal Binder | 5 lbs. 0 oz. |
| (Nonfat dry milk) | 5 lbs. 0 oz. |
| Salt | 3 lbs. 0 oz. |
| Dextrose | 1 lb. 0 oz. |
| Seasoning | 12 oz. |
| Garlic powder | 1 oz. |
| Sodium erythorbate | 2 oz. |
| Ice and/or water | 25-35 lbs. |

PROCEDURE

Grind cheek and heat meat twice through a 3/32" plate or chop to a smooth emulsion with half of the ice and water, salt and cure.

Grind other meats through ¼" to ½" plate.

Mix all ingredients 3 to 5 minutes in a mechanical mixer.

Regrind through 3/16" plate and stuff into 32 mm or larger hog or collagen castings. (May be cured overnight before regrinding.)

Link at 6" to 8" or hang on smoke sticks "rope style". Place in smokehouse and process as follows:

| TIME | TEMPERATURE DRY BULK | WET BULK | AIR DAMPERS | SMOKE |
|---|---|---|---|---|
| ½ hour | 130° F. | 0° F. | open | off |
| 1 hour | 150° F. | 115° F. | closed | on |
| Raise temperature 15° F./hour to | | | | |
| 145° F. internal | 170° F. | 137° F. | closed | on |
| to 160° F. internal | 170° F. | Steam or Hot Water | closed | off |

The processed sausage is submerged for about one week in an aqueous acid bath containing 2% acetic acid and 2% lactic acid and then is removed and showered and then held in a cooler at 35°–40° F. until packaged.

EXAMPLES 5-7

Thuringer

|  | Ex. 5 | Ex. 6 | Ex. 7 |
|---|---|---|---|
| Cow meat 90% lean | 60 | | |
| Cow meat 85% lean | | 40 | |
| Beef Plate 50% lean | 30 | | |
| Pork Trimmings 35% lean | 10 | 10 | 10 |
| Beef hearts 95% lean | | 20 | 20 |
| Beef plates 50% lean | | 30 | 40 |
| Beef cheeks 92% lean | | | 30 |
| Bacteria Inoculum *Lactobacillus Genera* | .25 | .25 | .25 |
| Salt | 2.75 | 2.75 | 2.75 |
| Garlic powder | .05 | .05 | .05 |
| Dextrose | 1.0 | 1.0 | 1.0 |

All of the meat is ground through a ¼" plate. The salt, inoculum, garlic powder or other seasoning, and dextrose are added with mixing and then mixing is continued for an additional two to three minutes.

The mixture is placed in a cooler to cure for 24 hours at 40° F., after which the mixture is reground through a 3/16" plate and additionally mixed for two to three minutes.

The mixture is then packaged into sewed hog bungs and placed in the smokehouse for 24 hours, maintained at 100° F. and 90% relative humidity, to give the mixture a light smoke. While in the smokehouse, the temperature is raised 10° per hour until a smokehouse temperature of 155° F. is reached, and it is held at this temperature for 10 minutes.

The lightly smoked and cooked thuringer is immersed overnight in an aqueous bath at 85° F., having a total acidity of 10% made up of 6% by weight lactic acid and 0.2% by weight parahydroxybenzoic acid. The latter can be substituted in whole or in part with other edible acids such as benzoic acid, sorbic acid, or acetic acid, or the acidity can be made up entirely of lactic acid.

The treated thuringer is then packaged and held at room temperature.

It will be understood that changes may be made in the details of formulation and operative conditions without departing from the spirit of the invention, especially as defined in the following claims.

We claim:

1. In the preparation of a sausage, the improvement in the stability and taste of the sausage wherein the cooked or smoked and cooked sausage is immersed in an aqueous medium having a total acidity up to 20% by weight, wherein lactic acid makes up at least 25% of the acidity with edible organic acids making up the remainder for a time to provide for complete penetration of the sausage.

2. The preparation as claimed in claim 1 in which the aqueous medium has a total acidity within the range of 2% to 20%.

3. The preparation as claimed in claim 1 in which the total acidity is within the range of 4% to 10% by weight.

4. The preparation as claimed in claim 1 in which lactic acid constitutes at least 40% of the total acidity.

5. The preparation as claimed in claim 1 in which the sausage is immersed in the aqueous medium until the pH of the sausage is reduced to below 5.3.

6. The preparation as claimed in claim 5 in which the sausage is immersed in the aqueous medium until the pH is reduced to within the range of 3.5 to 4.5.

7. The preparation as claimed in claim 1 in which the aqueous medium is at room temperature to 155° F.

* * * * *